United States Patent
Bonner

[11] 3,822,596
[45] July 9, 1974

[54] EQUALIZATION MECHANISM FOR DIFFERENTIAL PRESSURE METER
[75] Inventor: John J. Bonner, Philadelphia, Pa.
[73] Assignee: Fischer & Porter Co., Warminster, Pa.
[22] Filed: Feb. 8, 1973
[21] Appl. No.: 330,662

[52] U.S. Cl. .................................... 73/407, 92/97
[51] Int. Cl. ............................................. G01l 7/08
[58] Field of Search ............ 73/407, 388; 92/48, 97

[56] References Cited
UNITED STATES PATENTS
3,563,138   2/1971   Symonds et al. ................... 73/407 R
3,751,988   8/1973   Reese, Sr. .......................... 73/407 R Primary Examiner—Donald O. Woodiel

[57] ABSTRACT

A differential pressure meter provided with a pair of nominally identical diaphragms linked by pins to the lower end of a pivoted force bar which is positioned intermediate the diaphragms. The diaphragms are mounted in pressure chambers respectively coupled to low and high pressure fluid inputs whereby the pins, as a result of diaphragm deflection, apply an input force to the bar that depends on the difference in input pressures. In order to correct for any lack of identity between diaphragms, the ends of the pins are secured to the bar by an adjustable clamp assembly. The clamp is rotatable about its center on the bar within limits determined by a pair of slots positioned above and below the center, the clamp being rotated to a degree adjusting the respective moment arms of the pins to balance the torque about the meter pivot. Screws passing through the clamp slots and received in the force bar serve to lock the clamp at its adjusted position.

4 Claims, 4 Drawing Figures

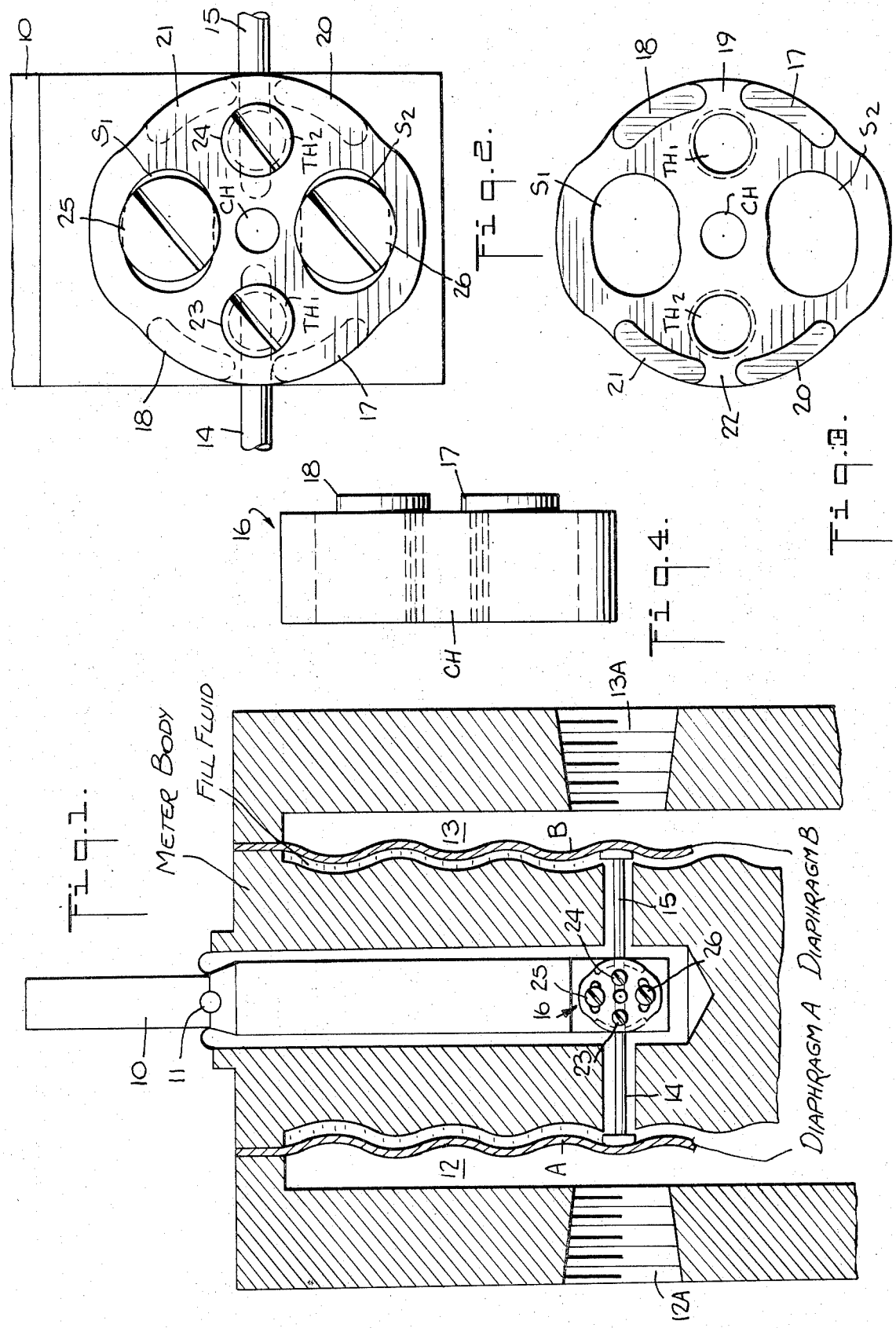

EQUALIZATION MECHANISM FOR DIFFERENTIAL PRESSURE METER

BACKGROUND OF INVENTION

This invention relates generally to differential fluid pressure meters including a capsule having a pair of pressure-responsive diaphragms, and more particularly to an adjustable clamp serving to attach the ends of pins connected to the diaphragms to a pivoted force bar in a manner neutralizing any lack of identity between the diaphragms.

In a differential pressure transmitter, an elongated force bar is pivoted about transverse axis. An input force derived from a differential pressure capsule and corresponding to the flow rate of the fluid to be measured is applied to the force bar to produce a force about its fulcrum. The capsule is provided with a pair of identical pressure chambers having diaphragms mounted therein. In practice, these chambers are coupled to pipes carrying fluid under pressure, the ends of the pipes being connected upstream and downstream of an orifice plate inserted in a fluid line, so that the resultant differential pressure is proportional to the rate of fluid flow through the line.

The diaphragms are linked by pins to the pivoted force bar which is deflected to an extent depending on the differential pressure. The degree of deflection is ordinarily directly proportional to differential fluid pressure only if the diaphragms have identical characteristics. In the absence of identity, the degree of deflection will depend on differences in the diaphragm characteristics as well as on differential fluid pressure.

In order to ensure diaphragm identity, various approaches have heretofore been taken, such as maintaining close control of diaphragm manufacture or by carefully selecting a matched pair of diaphragms from a mass-produced batch thereof. Also diaphragm mountings and fittings have been provided which act to trim the effective areas of the diaphragm to bring about an equal match therebetween.

Another approach is that taken in U.S. Pat. No. 3,563,138 wherein a relatively complicated mechanism is provided to neutralize any differences that exist in the diaphragm pair. In this mechanism the end of the force bar is provided with a connector having an oblique circumferential track, stems on the diaphragms being clamped on the track. To adjust for diaphragm differences, the stems are unclamped and the connector is rotated to shift the stems, one stem moving toward the axis of the deflection, the other moving away therefrom. In this way, the difference between the diaphragm responses to pressure is neutralized by differences in the effective lever arm of the diaphragms on the bar.

SUMMARY OF INVENTION

In view of the foregoing, it is the main object of this invention to provide an adjustable clamp assembly adapted to attach the ends of pins connected to the diaphragms of a differential pressure capsule to a pivoted force bar in a manner neutralizing any lack of identity between the diaphragms.

More particularly, it is an object of this invention to provide a simple, low-cost and efficient clamp assembly for equalizing the torque about the meter pivot.

Among the advantages of the invention are that the diaphragm pins may be readily connected to the clamp and that angular adjustment and locking of the clamp may be effected quickly and without difficulty.

Briefly stated, these objects are attained in a differential pressure meter having a pair of nominally identical diaphragms mounted in pressure chambers and linked by pins to the lower end of a pivoted force bar positioned intermediate the diaphragms. The ends of the pins are secured to opposing sides of a clamp which is rotatable about its center on the lower end of the force bar within limits determined by a pair of slots disposed above and below the center.

The clamp is rotated to an extent and in a direction adjusting the respective moment arms of the pins to balance the torque about the meter pivot. Screws passing through the clamp slots and received in the bar serve to lock the clamp at its adjusted position.

OUTLINE OF DRAWINGS

For a better understanding of the invention as well as other objects and further features thereof, reference is made to the following detailed description to be read in conjunction with the accompanying drawings, wherein:

FIG. 1 schematically shows a differential pressure meter provided with an adjustable clamp assembly serving as an equalization mechanism in accordance with the present invention, FIG. 2 is a front view of the clamp assembly, FIG. 3 is a rear view of the clamp included in the assembly, and FIG. 4 is a side view of the clamp.

DESCRIPTION OF INVENTION

Referring now to FIG. 1, there is shown a differential pressure meter including a capsule adapted to produce an input force corresponding to the flow rate of the fluid to be measured, the input force being applied to a force bar 10 to produce a force about its fulcrum 11. Formed in the body of the capsule are two identical pressure chambers 12 and 13, chamber 12 being coupled through port 12A to the low pressure side of a fluid line and chamber 13 being coupled through port 13A to the high pressure side of the line. The invention is applicable to any existing form of differential pressure meter, and the drawing is only for purposes of illustrating the principles underlying the invention.

Mounted in chamber 12 is a diaphragm A and mounted in chamber 13 is a nominally-identical diaphragm B, the diaphragms being disposed on either side of the force bar. Diaphragm A is connected to the low pressure side of force bar 10 by a pin 14 and diaphragm B is connected to the high pressure side of the force bar by a pin 15. The extremities of pins 14 and 15 are secured to the force bar by a clamp assembly which includes a clamp 16.

Clamp 16, as shown in FIGS. 2, 3 and 4, has a generally elliptical form and is provided with a center hole CH which serves as a rotational center during adjustment. It is to be understood that the invention is by no means limited to an elliptical form. The clamp may be made of stainless steel or any other suitable high-strength material. Symmetrically positioned with respect to center hole CH are two pairs of arcuate ridges disposed along the periphery on opposite sides of the clamp. The ridges 17 and 18 are spaced from each other to define a guide 19 for the end of pin 14. The ridges 20 and 21 are spaced from each other to define a guide 22 for the end of pin 15.

Bored in clamp 16 in line with guides 19 and 22 are two tapped holes $TH_1$, $TH_2$ which are adapted to receive set screws 23 and 24, as shown in FIG. 2. These set screws press into and positively lock the ends of the diaphragm pins inserted in the guides. Also formed in clamp 16, above and below center hole CH, are two oblong slots $S_1$ and $S_2$, the center of the slots lying on a diameter axis normal to the common axis of the guides. Passing through slots $S_1$ and $S_2$ are mounting screws 25 and 26, respectively, these screws being received in threaded bores in the lower end of the force bar.

The two pairs of ridges 17–18 and 20–21 serve to trap the diaphragm pins so that rotation of clamp 16 about its center hole CH will cause one diaphragm pin to move toward the meter body pivot 11 and the other pin to move away from the pivot or vice versa, depending on the direction of clamp rotation.

In practice, diaphragms A and B are reasonably prematched to provide effective areas within some degree of tolerance. Hence it is not essential to maintain close control of diaphragm manufacturing operations. The selected diaphragms are then welded to the meter body. At this point, the following procedure is followed to bring about an exact match in the characteristics of the differential pressure system.

First, an internal pressure, positive or negative, is applied to the meter body for the purpose of simulating any condition — typically, ambient temperature — that will result in a change of volume of the fluid which fills the space behind the two diaphragms. This fluid volume change gives rise to a pressure change as a function of the compliance of the diaphragms.

If the effective areas of the diaphragms are somewhat different but their respective moment arms relative to the pivot of the meter body are identical, then a torsional error about the meter body pivot will result, to produce a perceptible deflection of the force bar. To correct for this error, the moment arms are adjusted to produce a balanced torque about the meter body pivot, thereby eliminating this variable as a source of error. This adjustment is made empirically, the clamp being rotated slightly in one direction or the other and then tightened to see the effect of a clamp setting on the force bar.

While there has been shown and described a preferred embodiment of an equalization mechanism for differential pressure meter, it will be appreciated that many changes and modifications may be made therein without, however, departing from the essential spirit thereof. For example, it is not necessary that rotation be about a center hole in the clamp, as long as rotation takes place about an axis which is perpendicular to the axis of the force bar and lies in a plane parallel to the planes of the diaphragms. Also, the adjustable clamp could be used as a mechanism for adjustment in a system that includes a welding process, such as an electron beam welding system, to actually secure the pins to the force bar.

I claim:

1. In a differential pressure meter including a capsule provided with a pair of pressure chambers each having a diaphragm mounted therein, the diaphragm being linked by pins to the lower end of a pivoted force bar whose position is intermediate the diaphragms, said bar being pivoted at a point adjacent the upper end thereof, an adjustable clamp assembly for securing said pins to the force bar, said assembly comprising:
   A. a one-piece clamp having a center hole and at least one slot displaced from the center hole to permit rotation of the clamp about the center hole in a plane parallel to the force bar to an extent and in a direction limited by the slot,
   B. means to secure the ends of the pins to opposing sides of the clamp at points lying on an axis passing through said center hole whereby rotation of the clamp about said center hole causes one pin to move toward the pivot point of the meter and the other pin to move away therefrom; and
   C. screw means passing through said slot and received in said force bar to lock said clamp thereto at an angular position at which the respective moment arms of the pins are adjusted to balance the torque about the meter pivot.

2. A clamp assembly as set forth in claim 1 wherein said clamp is provided with a pair of slots disposed above and below said center hole.

3. In a meter as set forth in claim 1 wherein said securing means includes a pair of ridges formed on either side of the clamp, the ridges in each pair being spaced to define a guide for accommodating the ends of the pins.

4. In a meter as set forth in claim 3 further including a pair of tapped holes in said clamp in line with said guides to receive set screws for engaging the inserted pins.

* * * * *

UNITED STATES PATENT OFFICE
CERTIFICATE OF CORRECTION

Patent No. 3,822,596    Dated August 6, 1974

Inventor(s) John J. Bonner

It is certified that error appears in the above-identified patent and that said Letters Patent are hereby corrected as shown below:

Column 1, line 13 "about transverse" should have read
-- about a transverse --

Column 1, line 39 "diaphragm" should have read -- diaphragms --

Column 2, line 39 "forcd" should have read -- forced --

Signed and sealed this 8th day of October 1974.

(SEAL)
Attest:

McCOY M. GIBSON JR.
Attesting Officer

C. MARSHALL DANN
Commissioner of Patents